(12) United States Patent
Bender et al.

(10) Patent No.: US 11,157,858 B2
(45) Date of Patent: Oct. 26, 2021

(54) RESPONSE QUALITY IDENTIFICATION

(71) Applicant: International Business Machines Corporation, Armonk, NY (US)

(72) Inventors: Michael Bender, Rye Brook, NY (US); Craig M. Trim, Ventura, CA (US); Algenon Willis, Stamfor, CT (US); Margaret T. Serafin, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 317 days.

(21) Appl. No.: 16/202,222

(22) Filed: Nov. 28, 2018

(65) Prior Publication Data

US 2020/0167714 A1 May 28, 2020

(51) Int. Cl.
*G06Q 10/00* (2012.01)
*G06F 3/00* (2006.01)
*G06Q 10/06* (2012.01)
*G06F 3/0482* (2013.01)

(52) U.S. Cl.
CPC ..... *G06Q 10/06395* (2013.01); *G06F 3/0482* (2013.01)

(58) Field of Classification Search
CPC .................. G06Q 10/00–50/00; G06F 3/00
USPC ............................... 705/7.11–7.42
See application file for complete search history.

(56) References Cited

U.S. PATENT DOCUMENTS

| 6,161,101 | A | 12/2000 | Guinta et al. |
| 8,583,568 | B2 | 11/2013 | Garland et al. |
| 9,881,062 | B2 | 1/2018 | Shifman et al. |
| 2002/0128898 | A1* | 9/2002 | Smith, Jr. ........ G06Q 30/0203 705/7.32 |
| 2002/0138333 | A1* | 9/2002 | DeCotiis .......... G06Q 10/067 705/7.32 |
| 2009/0055245 | A1 | 2/2009 | Bostock et al. |
| 2012/0173305 | A1* | 7/2012 | Bhaskaran ....... G06Q 30/0203 705/7.32 |

(Continued)

FOREIGN PATENT DOCUMENTS

WO 2002065232 A2 11/2000

OTHER PUBLICATIONS

InfoSurv; 5 Reasons Why Survey Respondents Don't Tell the Truth, https://www.infosurv.com/5-reasons-why-survey-respondents-dont-tell-the-truth/, 2018.

*Primary Examiner* — Alan S Miller
*Assistant Examiner* — Mustafa Iqbal
(74) *Attorney, Agent, or Firm* — Garg Law Firm, PLLC; Rakesh Garg; Brian Restauro

(57) ABSTRACT

One or more responses to one or more queries from a device associated with a respondent are received. A processor determines a response quality rating for the one or more responses based on at least one of an identifiable pattern of the one or more responses, a response rate of the one or more responses, an attentiveness level of the respondent, or a characteristic of an interaction of the respondent with a user interface of the device. The one or more responses are determined to be indicative of a questionable validity based upon the determined response quality rating. Responsive to determining that the one or more responses are indicative of a questionable validity one or more secondary queries are sent to the device.

20 Claims, 5 Drawing Sheets

(56) References Cited

U.S. PATENT DOCUMENTS

| | | | |
|---|---|---|---|
| 2013/0246302 A1* | 9/2013 | Black | G06Q 30/0185 |
| | | | 705/347 |
| 2016/0092807 A1* | 3/2016 | Fernandes Cavalcante | ............... |
| | | | G06Q 10/0635 |
| | | | 705/7.28 |
| 2017/0295194 A1 | 10/2017 | Zitouni et al. | |
| 2019/0228673 A1* | 7/2019 | Dolsma | G09B 7/04 |
| 2020/0042577 A1* | 2/2020 | Kasa | G06F 40/117 |

* cited by examiner

RESPONSE QUALITY IDENTIFICATION

TECHNICAL FIELD

The present invention relates generally to a method, system, and computer program product for identifying response quality for computer-implemented questionnaire results. More particularly, the present invention relates to a method, system, and computer program product for identifying response quality for computer-implemented questionnaire results based upon respondent behavior.

BACKGROUND

Surveys and other questionnaires are often used to provide an individual or organization with insight into the views of other individuals regarding a topic. The topics can range from an overall satisfaction with a product or process, to the maturity of a process. At times, organizations may be assessed based on a satisfaction rating received as a result of a survey. Surveys are often implemented by a computer that is configured to present questions to a user and receive responses to the queries from the user. Responses from a number of users are often pooled together to provide the individual or organization with survey results representative of the responses from the pool of users.

SUMMARY

The illustrative embodiments provide a method, system, and computer program product. An embodiment of a computer-implemented method includes receiving one or more responses to one or more queries from a device associated with a respondent. The embodiment further includes determining, by a processor, a response quality rating for the one or more responses based on at least one of an identifiable pattern of the one or more responses, a response rate of the one or more responses, an attentiveness level of the respondent, or a characteristic of an interaction of the respondent with a user interface of the device. The embodiment further includes determining that the one or more responses are indicative of a questionable validity based upon the determined response quality rating. The embodiment further includes sending, responsive to determining that the one or more responses are indicative of a questionable validity, one or more secondary queries to the device.

Another embodiment further includes receiving one or more secondary responses from the device in response to the secondary queries in which the secondary queries are indicative of a validity of the one or more responses.

Another embodiment further includes determining that the one or more responses are valid based upon the secondary responses, and adding the one or more responses to a result responsive to determining that the one or more responses are valid.

Another embodiment further includes determining that the one or more responses are not valid based upon the secondary responses, and removing the one or more responses from a result responsive to determining that the one or more responses are not valid.

In another embodiment, determining that the one or more responses are not valid further includes decreasing the response quality rating for the one or more responses based upon the one or more secondary responses. In the embodiment, removing the one or more responses is responsive to determining that the response quality rating is below a first threshold value.

Another embodiment further includes decreasing the response quality rating for the one or more responses based upon the one or more secondary responses, determining that the response quality rating is less than a second threshold value, decreasing a weighting value associated with the one or more responses responsive to determining that the response quality rating is less than the second threshold value, and adding the one or more responses to a result.

Another embodiment further includes generating the one or more secondary queries by changing an order of the one or more queries. In another embodiment, the one or more secondary queries includes a query for an explanation from the respondent of the one or more responses. In another embodiment, the one or more secondary response includes an explanation of the one or more responses in a free-text form. Another embodiment further includes performing a sentiment analysis of the explanation to determine the validity of the one or more responses.

Another embodiment further includes determining a skill level associated with the respondent in which the validity of the one or more responses is based, at least in part, upon the determined skill level.

In another embodiment, the attentiveness level of the respondent is based upon eye movements of the respondent during reading of the one or more queries.

In another embodiment, the characteristic is indicative of a problem with the respondent using the user interface to choose a particular response from available responses.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
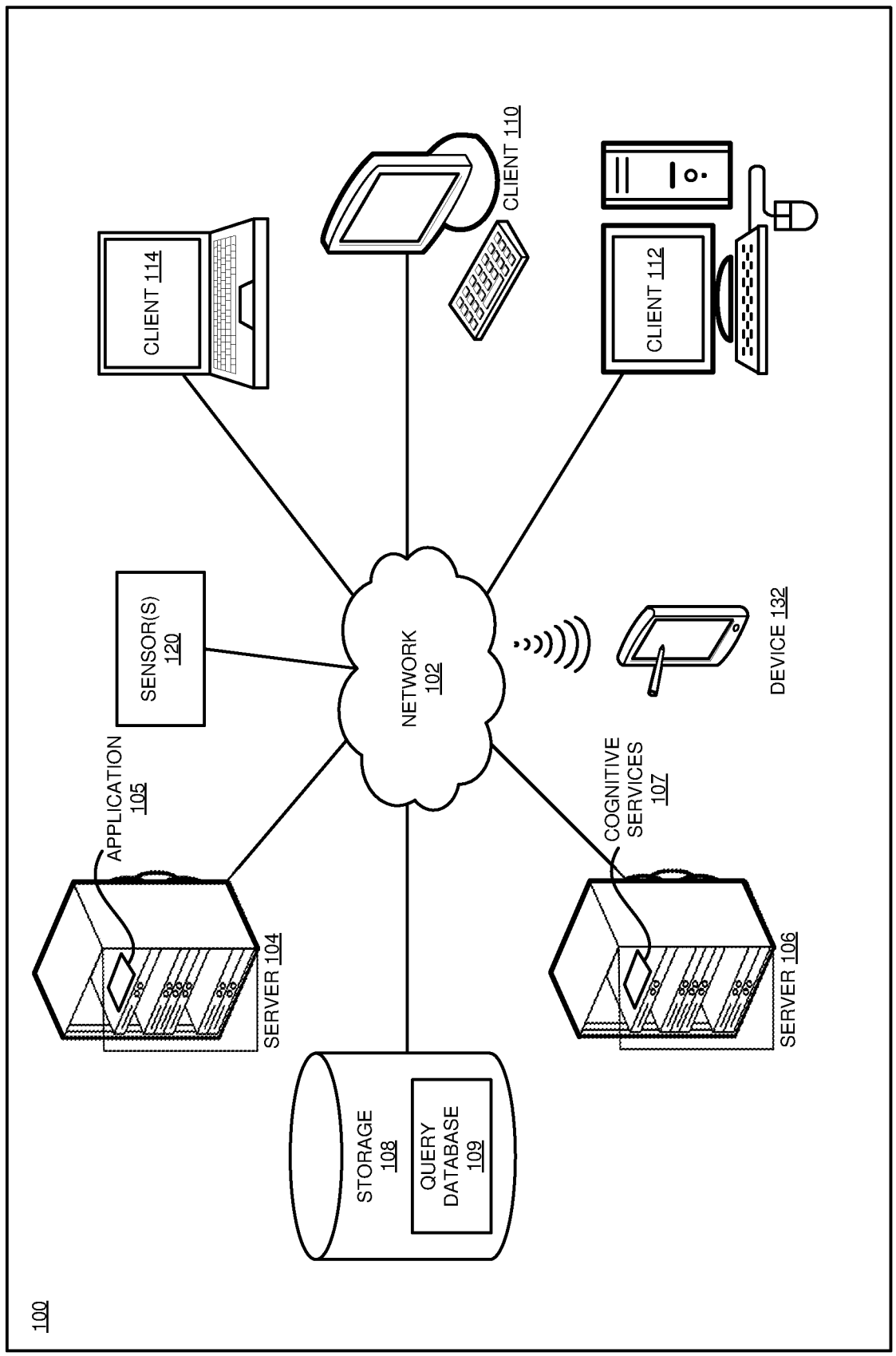
FIG. 1 depicts a block diagram of a network of data processing systems in which illustrative embodiments may be implemented.

Embodiments recognize that often during answering of survey questions and other questionnaires, individuals (e.g., respondents) may not be attentive to the questions when answering them and may be answering the questions as quickly as possible without fully considering the questions. In one or more embodiments, a respondent is an individual or user who replies to one or more queries associated with a questionnaire, survey, or other set of questions. Embodiments recognize that responses from these respondents may be questionable with respect to validity. For example, respondents may wish to present a more favorable representation of themselves, provide more acceptable answers, and may wish to avoid questions regarding behavior that they do not wish to disclose. In another example, respondents may wish to provide answers that they believe will "help" or "please" a researcher or provide responses that may influence the outcome of research in a manner that is favorable to them. One or more embodiments described herein address the problems of identifying response quality for computer-implemented questionnaire results.

An embodiment described herein provides for identifying response quality for computer-implemented questionnaire results based upon respondent behavior. In the embodiment, a system provides queries to a respondent and receives responses (e.g., answers) to the queries. In particular embodiments, a query may include a multiple-choice question and the responses may include a selection of one or more of the choices. In the embodiment, the system analyzes one or more factors to determine a response quality rating of one or more of the responses that is indicative that the response to the one or more queries may be questionable or indicative of a confounding result. In particular embodiments, the response quality rating may be decreased for the one or more response if the responses match an identifiable pattern, if the respondent has entered responses at rate that is statistically faster than other respondents, if sensor data indicates that the respondent may not be attentive when answering the queries, or if a user interface (UI) interaction characteristic indicates that the respondent may not have been physically able to access all of the available choices to the queries.

In an example, the system may determine that the respondent is providing responses that match an identified pattern such as that the respondent is entering all "C" responses or entering responses in a pattern of "A", "B", "C", "D". In such an example, the system may determine that identified pattern may be indicative that the respondent is not providing valid responses to the queries, mark the one or more responses as questionable with respect to validity, and decreasing a response quality rating of the one or more responses from a default value by a predetermined configurable amount.

In another example, the system may determine that the respondent has entered responses to the queries at a response rate that is greater than a statistically significant amount (e.g., greater than an average or a particular standard deviation of a group of other respondents). In such an example, the system may determine that the respondent is not spending an adequate time considering the queries which may be indicative that the respondent is not providing valid responses to the queries, mark the one or more responses as questionable with respect to validity, and decreasing a response quality rating of the one or more responses by a configurable amount.

In another example, the system receives camera data from a camera focused on the respondent and determines that the eye movements of the respondent indicate that the respondent is not likely reading the queries because the eyes are not moving in relation to a number of lines that need to be read for each query or across multiple queries. In such an example, the system may determine that the sensor data indicates that the respondent may not be attentive to answering the queries, mark the one or more responses as questionable with respect to validity, and decrease the response quality rating of the one or more responses by a predetermined configurable amount.

In another example, the system receives camera data from a camera focused on the respondent indicating that the hand positions of the respondent limit responses such as that the respondent is using a mobile phone and the respondent's thumb and/or fingers cannot reach all of the screen in order to access one or more of the choices. In such an example, the system may determine that a user interface (UI) interaction characteristic indicates that the respondent may not have been physically able to access all of the available choices to the queries, mark the one or more responses as questionable with respect to validity, and decrease the response quality rating of the one or more responses by a predetermined configurable amount.

In the embodiment, if the system determines that one or more responses are questionable based upon the response quality rating being less than a predetermined rating quality threshold, the system determines one or more secondary queries to present to the respondent to generate a conviction rating for the one or more responses.

In particular embodiments, the secondary queries include additional questions that have previously been prepared to be presented to the respondent in order to attempt to validate a previous query. In a particular embodiment, the additional questions are in the same format and content as the original queries but presented in a different context such that a logical response would be in a different order, for example, a reverse order. An example of asking the question in a different context and order is to ask the negative version of the question. In the embodiment, the system determines whether the respondent's responses to the queries have changed. For example, if the system asks the respondent a question in reverse order and receives an identical response even if the choice is in a different location on the UI, the system may increase a conviction rating that the response from the respondent is valid.

In another particular embodiment, the system may present a query to the respondent which requires a free-form text response in which the respondent enters unstructured text to provide the response instead of selection of a particular choice from a multiple-choice answer. In the particular embodiment, the system performs sentiment analysis upon the free-form response to determine if the answer is consistent with the previous response from a structured query. For example, the system may ask a respondent for an explanation of a previous answer, process the explanation through a natural language sentiment analysis process to determine if the explanation is consistent with the answer. If the explanation is consistent, the system may increase the conviction rating of the response.

In an embodiment, the system determines whether the conviction rating is less than a predetermined threshold and removes responses with a conviction rating less the predetermined threshold from the results. In a particular embodiment, the system may modify a weighting associated with a response based upon the conviction rating. For a response with a relatively low conviction rating, the system may lower the weight associated with the response, thus deemphasizing the response from the results.

In a particular embodiment, for questions that require a specific level of skill or experience, the system may query the respondent for a demonstration of the skill (e.g. badges, certifications, experience from independent sources or social media) or the experience (e.g., a number representative of an amount of time spent by the respondent in meetings per week). In a particular embodiment, the system may conclude that responses are questionable for numbers outside a typical range since the respondent may be answering questions that the respondent doesn't have the necessary experience or skill. In a particular embodiment, the system may determine a skill level of the respondent by asking a question having an expected skill metric associated with a response, and lower the response quality rating if the demonstrated skill level of the response is outside of an expected answer or a baseline skill level. In a particular embodiment, the system may request that the respondent demonstrate a particular skill level and use natural language processing of secondary response to qualify the skill. If the skill is not qualified, the system may lower the response quality rating.

In an example use case, a respondent is taking a test for the respondent's organization to determine an assessment rating for the respondent. The respondent is aware that the respondent is being measured for the assessment rating and gives every question a perfect score and responds faster than the average for the organization (e.g., 0.8 standard deviations faster). Based on the speed the respondent enters responses, the system asks reverse order questions and receives an unexpected positive answer. The system further askes the respondent how many hours per week the respondent spends in a scrum, and the respondent enters a value of 0. Based on the combination of these factors, the system determines that the respondent's responses are questionable and eliminates the responses or uses with decreased confidence from within the pool of responses.

In another example use case, a respondent is taking a survey on a service the respondent received and answers every other question excellent or very good. After one of the questions is answered with an excellent rating, the respondent is asked to describe a situation in which the service was excellent. At this point, the respondent responds with an answer that has a neutral sentiment analysis and biometrics associated with the respondent indicate stress when the question is present. In the example, the system removes responses associated with the respondent from the pool of responses.

In another example use case, a respondent is answering a survey on a recent hospital stay. The respondent answers every question with an excellent rating and does so very quickly. When additional questions are asked in a reverse format, the respondent's responses changes to a new format. When asked why the service was excellent, the respondent praises one of the nurses and does so quickly. In the example, the system determines that the respondent's responses are valid and are included in the results.

In still another example use case, a respondent visits a restaurant that offers a discount for answering a survey. When the respondent takes the survey, the system determines that the respondent's eyes are not reading the questions and the respondent's hand is positioned such that it cannot reach the entire screen. Based on these factors, the system determines that survey results associated with the respondent are questionable.

An embodiment can be implemented as a software application. The application implementing an embodiment can be configured as a modification of an existing network management system or platform, as a separate application that operates in conjunction with an existing network management system or platform, a standalone application, or some combination thereof.

The illustrative embodiments are described with respect to certain types of tools and platforms, procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
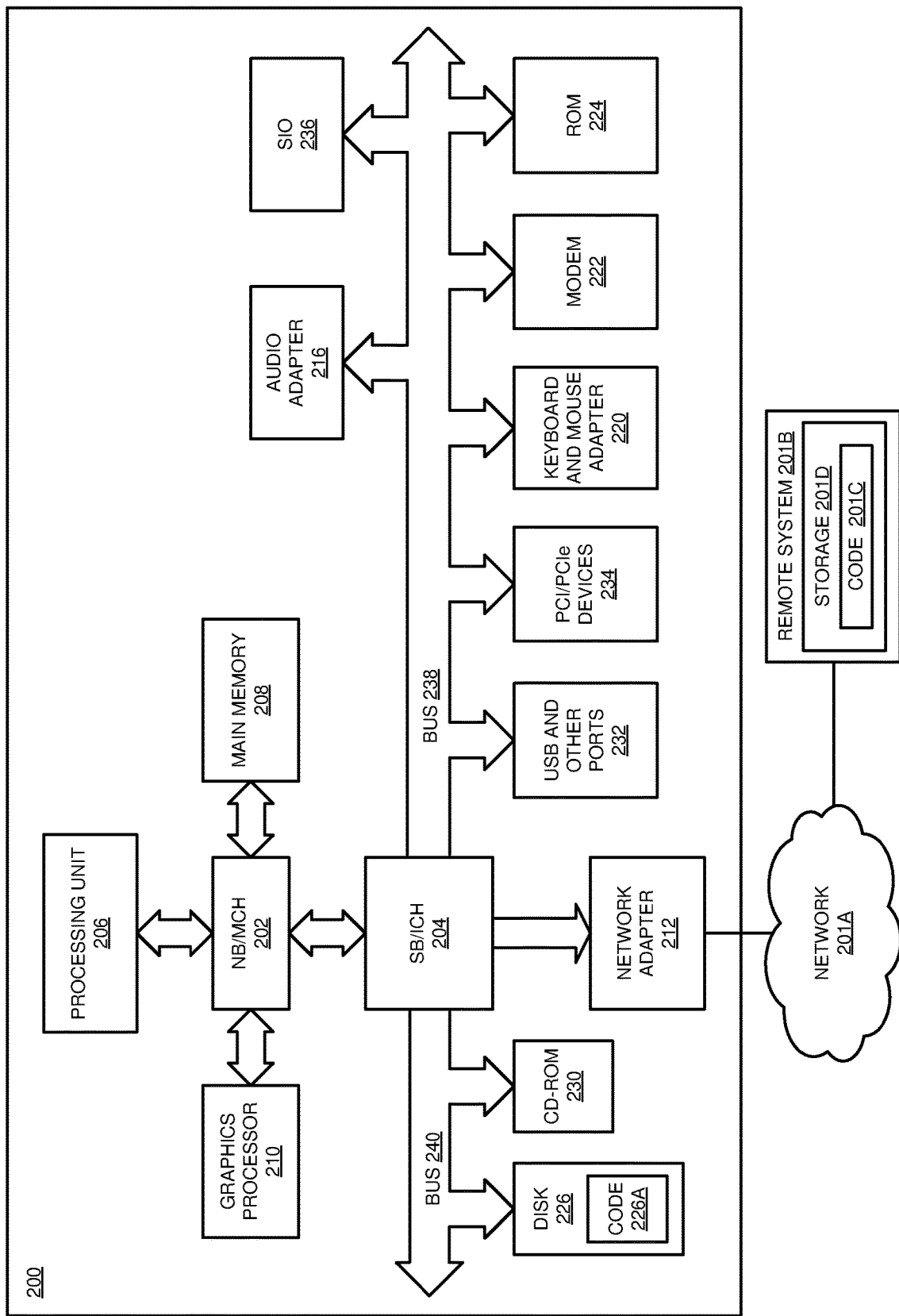
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for identifying response quality for computer-implemented questionnaire results based upon respondent behavior in accordance with one or more embodiments. Server 106 includes one or more cognitive services 107 configured to perform sentiment analysis, such as natural language processing (NLP), upon responses received from a respondent as described herein with respect to one or more embodiments.

Storage device 108 includes a query database 109 configured to query data such as queries to be presented to one or more respondents as described herein. Data processing environment 100 further includes one or more sensor devices 120 configured to provide sensor data such as described with respect to certain embodiments herein. In particular embodiments, sensor devices 120 may include one or more of a smart phone, a camera, a motion sensor device, a biometric sensor, an audio capture device, a video capture device, a tablet computer, a laptop computer, a telephone device, or other sensor device associated with network 102.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 or server 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
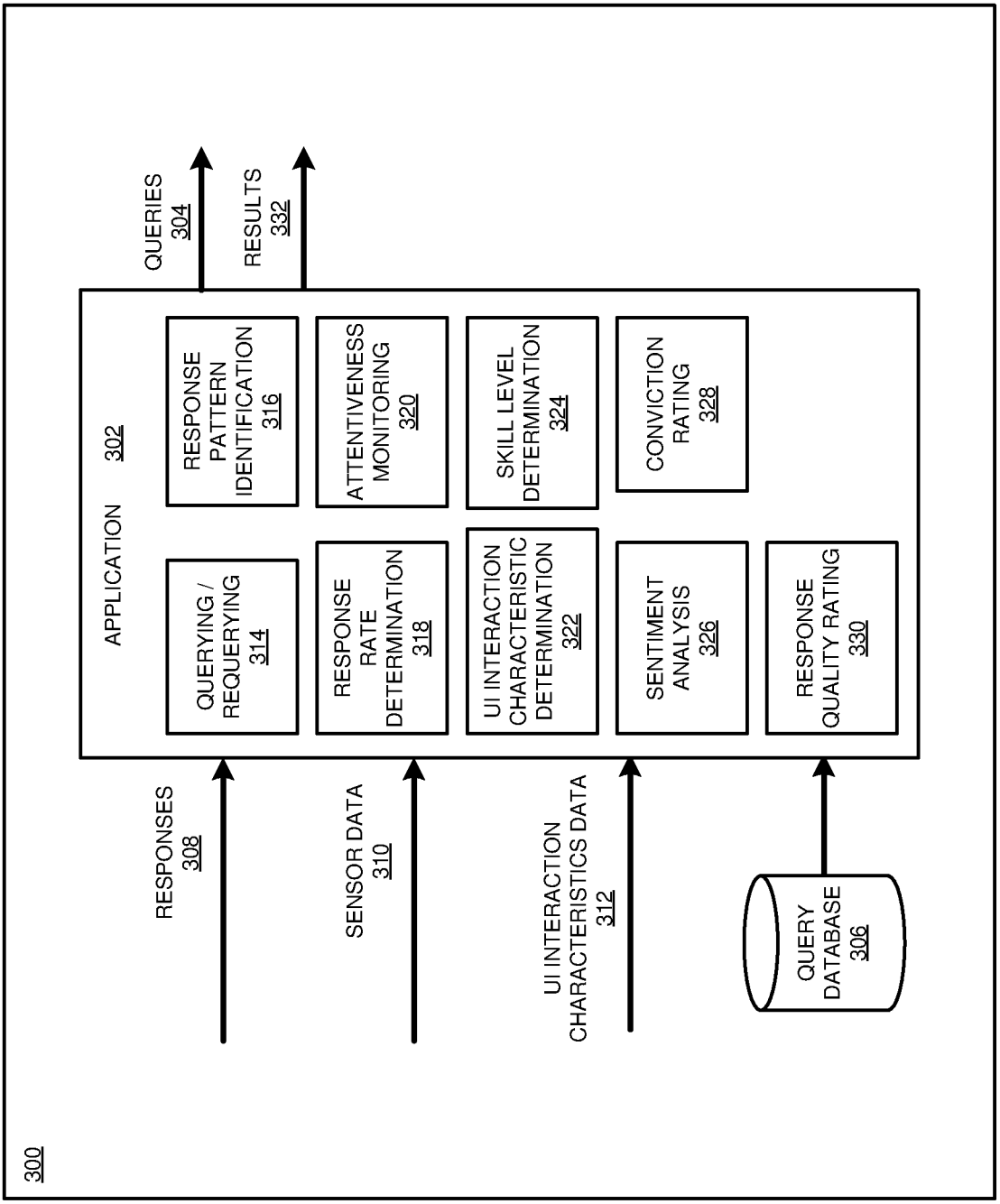
FIG. 3 depicts a block diagram of an example configuration for identifying response quality for computer-implemented questionnaire results based upon respondent behavior in accordance with an illustrative embodiment.

With reference to FIG. 3, this figure depicts a block diagram of an example configuration 300 for identifying response quality for computer-implemented questionnaire results based upon respondent behavior in accordance with an illustrative embodiment. The example embodiment includes an application 302. In a particular embodiment, application 302 is an example of application 105 of FIG. 1.

Application 302 sends queries 304 retrieved from a query database 306 to one or more respondents and receives one or more responses 308 to queries 304 from the one or more respondents. Query database 306 includes a corpus of queries associated with a survey or questionnaire to be presented to the one or more respondents. Application 302 further receives sensor data 310 obtained from one or more sensors associated with a respondent. In particular embodiments, sensor data 310 includes biometric data or image data indicative of an attentiveness level of the respondent during generating of response 308 by the respondent. In a particular example, sensor data 310 includes eye movement data that is indicative of whether the respondent is reading the queries and responses before providing the responses. Application 302 further receives user interface (UI) interaction characteristics data 312. In one or more embodiments, UI interaction characteristics data 312 is indicative of an aspect of interaction of the respondent with a UI during review of queries 304 and providing of responses 308. In one or more embodiments, UI interaction characteristics data 312 is indicative of a problem with the respondent using the UI to choose a response from available responses. In a particular example, UI interaction characteristics data 312 includes data to detect the finger positions of the respondent, such as image data, to determine if the respondent is able to interact with the UI to provide a specific response among a choice of responses. In one or more embodiments, the respondent may be provided with a choice to opt-out of collection of one or more of sensor data 310 and UI interaction characteristic data 312.

Application 302 includes a querying/requerying component 314, a response pattern identification component 316, a response rate determination component 318, an attentiveness monitoring component 320, a UI interaction characteristic determination component 322, a skill level determination component 324, a sentient analysis component 326, a conviction rating component 328, and a response quality rating component 330. Querying/requerying component 314 is configured to send initial queries to respondents and requery respondents with secondary queries for responses that are determined to be questionable as further described herein with respect to certain embodiments.

Response pattern identification component 316 is configured to determine whether a respondent has provided responses that match an identified pattern as described herein with respect to one or more embodiments. Response rate determination component 318 is configured to determine whether a respondent has entered responses to queries at a response rate that is at a statistically significant greater response rate than a group of other respondents as described herein with respect to certain embodiments.

Attentiveness monitoring component 320 is configured to monitor an attentiveness level of a respondent while the respondent is providing responses to determine whether the respondent is sufficiently attentive when providing the responses based upon sensor data 310 as described herein with respect to certain embodiments. UI interaction characteristic determination component 322 is configured to determine a UI characteristic that indicates whether the respondent was physically able to access all of the available choices to the queries presented in the UI based upon UI interaction characteristics data 312 as described herein with respect to one or more embodiments.

Skill level determination component 324 is configured to determine whether a particular query requires a specific level of skill or experience of the respondent, and determine whether the respondent has demonstrated the specific level of skill or experience as described herein with respect to one or more embodiments. In one or more embodiments, skill level determination component 324 may access social media or a skill repository associated with the respondent to determine a skill level of the respondent. In one or more embodiments, the respondent may be provided with a choice to opt-out of allowing access to the social media and/or skill repository.

Sentiment analysis component 326 is configured to determine a sentiment of a response, such as a free-form text response, to determine whether the sentiment matches a previous response regarding the same or a similar query as described herein with respect to various embodiments. In one or more embodiments, the sentiment analysis determines a view, attitude, or opinion of the respondent towards the query. In particular embodiments, the sentiment analysis using natural language processing or another suitable cognitive processing technique to determine the sentiment associated with the response.

Conviction rating component 328 is configured to determine a conviction rating of a respondent for one or more responses indicative of a conviction of the respondent in being able to answer a query as described with respect to certain embodiments herein. Response quality rating component 330 is configured to determine a response quality rating of one or more of responses 308 that is indicative that the response to one or more queries 304 may be questionable or a confounding result based upon one or more factors as described herein with respect to various embodiments.

In one or more embodiments, application 302 eliminates responses and/or reduces a weighting of responses having a response quality rating below one or more threshold values, and outputs questionnaire results 332 including the one or more responses having response quality ratings above the threshold values and/or the weighted responses as described herein with respect to various embodiments.

Figure 4:
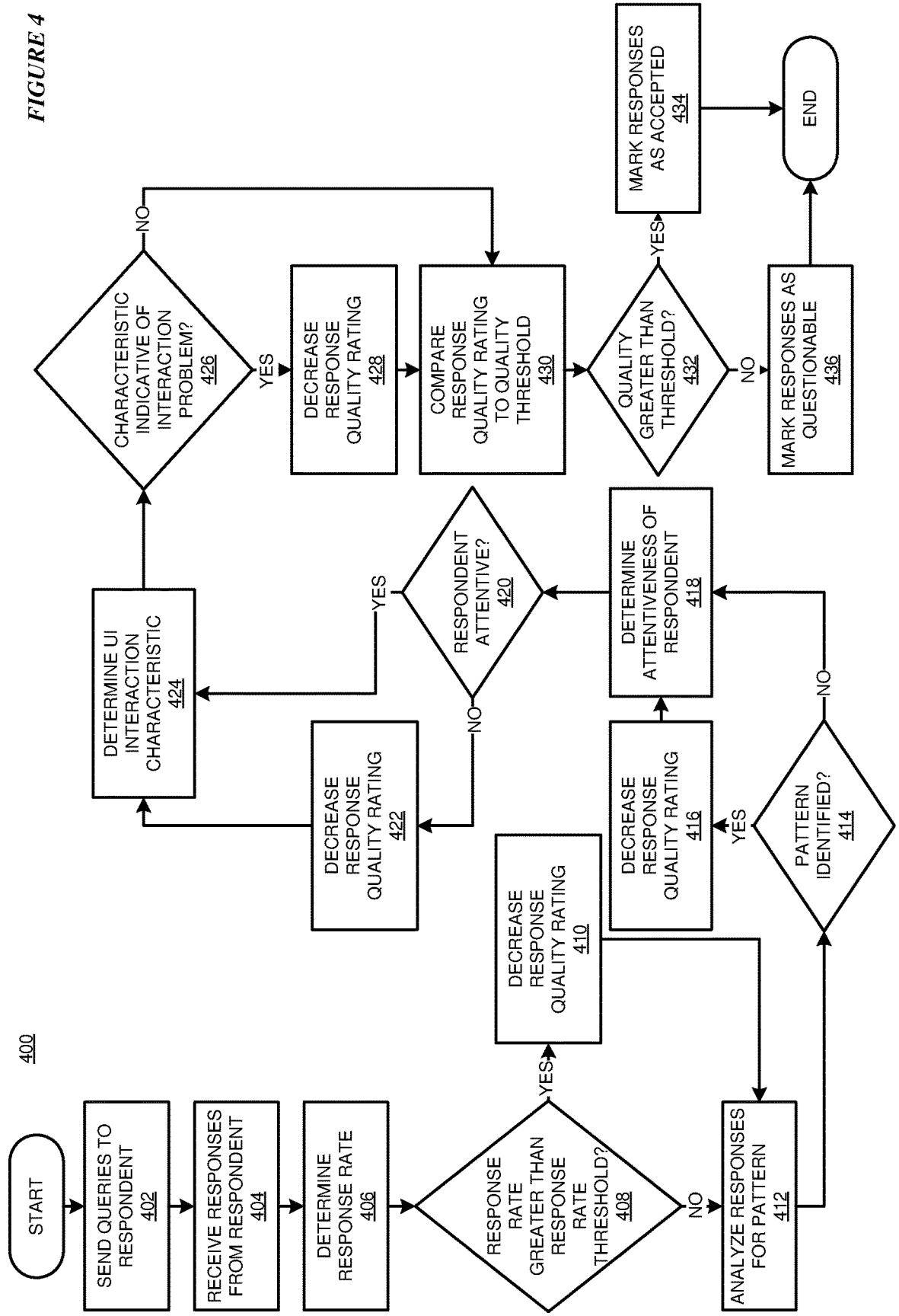
FIG. 4 depicts a flowchart of an example process for identifying response quality for computer-implemented questionnaire responses based upon respondent behavior in accordance with an illustrative embodiment.

With reference to FIG. 4, this figure depicts a flowchart of an example process 400 for identifying response quality for computer-implemented questionnaire responses based upon respondent behavior in accordance with an illustrative embodiment. In block 402, application 105 sends one or more queries from a set of queries to a respondent. In particular embodiments, the queries include questions from a questionnaire. In block 404, application 105 receives one or more responses from the respondent in response to the one or more queries. In one or more embodiments, the respondent selects a response from a choice of responses and/or enters a free-form text response using a UI associated with a device such as client 110, client 112, client 114, or device 132 illustrated in FIG. 1. In an embodiment, the one or more responses are assigned a default response quality rating.

In block 406, application 105 determines a response rate of the one or more responses based upon a number of responses entered within a predetermined time period. In block 408, application 105 determines whether the response rate is greater than a response rate threshold. In a particular embodiment, the response rate threshold is equal to a particular standard deviation from a response rate of a group of other respondents. If the response rate is greater than the response rate threshold, in block 410 application 105 decreases the response quality rating associated with the one or more responses by a predetermined amount and proceeds to block 412. If the response rate is not greater than the response rate threshold, process 400 continues to block 412.

In block 412, application 105 analyzes the one or more responses to determine if the one or more responses match an identified response pattern. In block 414, application 105 determines whether a pattern is identified that may be indicative that the respondent is not providing valid responses to the queries. If a pattern is identified, in block 416 application 105 decreases the response quality rating associated with the one or more responses by a predetermined amount and proceeds to block 418. If a pattern is not identified, process 400 continues to block 418.

In block 418, application 105 determines an attentiveness level of the respondent while the respondent is providing responses to the one or more queries based upon sensor data, such as camera data indicating whether the respondents eyes were focused on the queries and available response choices during the providing of the one or more responses. In block 420, application 105 determines whether the respondent was attentive based upon the determined attentiveness level. In one or more embodiments, application 105 determines that the respondent was attentive if the attentiveness level exceeds an attentiveness threshold. If application 105 determines that the respondent was not attentive, in block 422 application 105 decreases the response quality rating associated with the one or more responses by a predetermined amount and proceeds to block 424. If application 105 determines that the respondent was attentive, process 400 continues to block 424.

In block 424, application 105 determines a UI interaction characteristic of the interaction of the respondent with the UI during providing of the one or more responses based upon UI interaction characteristic data associated with the respondent. In a particular embodiment, the UI interaction characteristic data includes information indicative of one or more finger positions of the respondent. In block 426, application 105 determines whether the UI interaction characteristic is indicative of an interaction problem of the respondent with the UI when attempting to choose a response from available responses. If application 105 determines that the UI interaction characteristic is indicative of an interaction problem, in block 428 application 105 decreases the response quality rating associated with the one or more responses by a predetermined amount and proceeds to block 430. If application 105 determines that the UI interaction characteristic is not indicative of an interaction problem, process 400 continues to block 430.

In block 430, application 105 compares the response quality rating to a threshold response quality rating value. In block 432, application 105 determines whether the response quality rating is greater than the response quality rating threshold value. If application 105 determines that the response quality rating is greater than the response quality rating threshold value, in block 434 application 105 marks the one or more responses as validated and acceptable, and process 400 ends. If application 105 determines that the response quality rating is not greater than the response quality rating threshold value, in block 436 application 105 marks the one or more responses as questionable and process 400 ends. In one or more embodiments, application 105 eliminates responses and/or reduces a weighting of responses having a response quality rating below the response quality rating threshold values from questionnaire results and includes the responses having response quality ratings above the response quality rating threshold value as described herein with respect to various embodiments.

Figure 5:
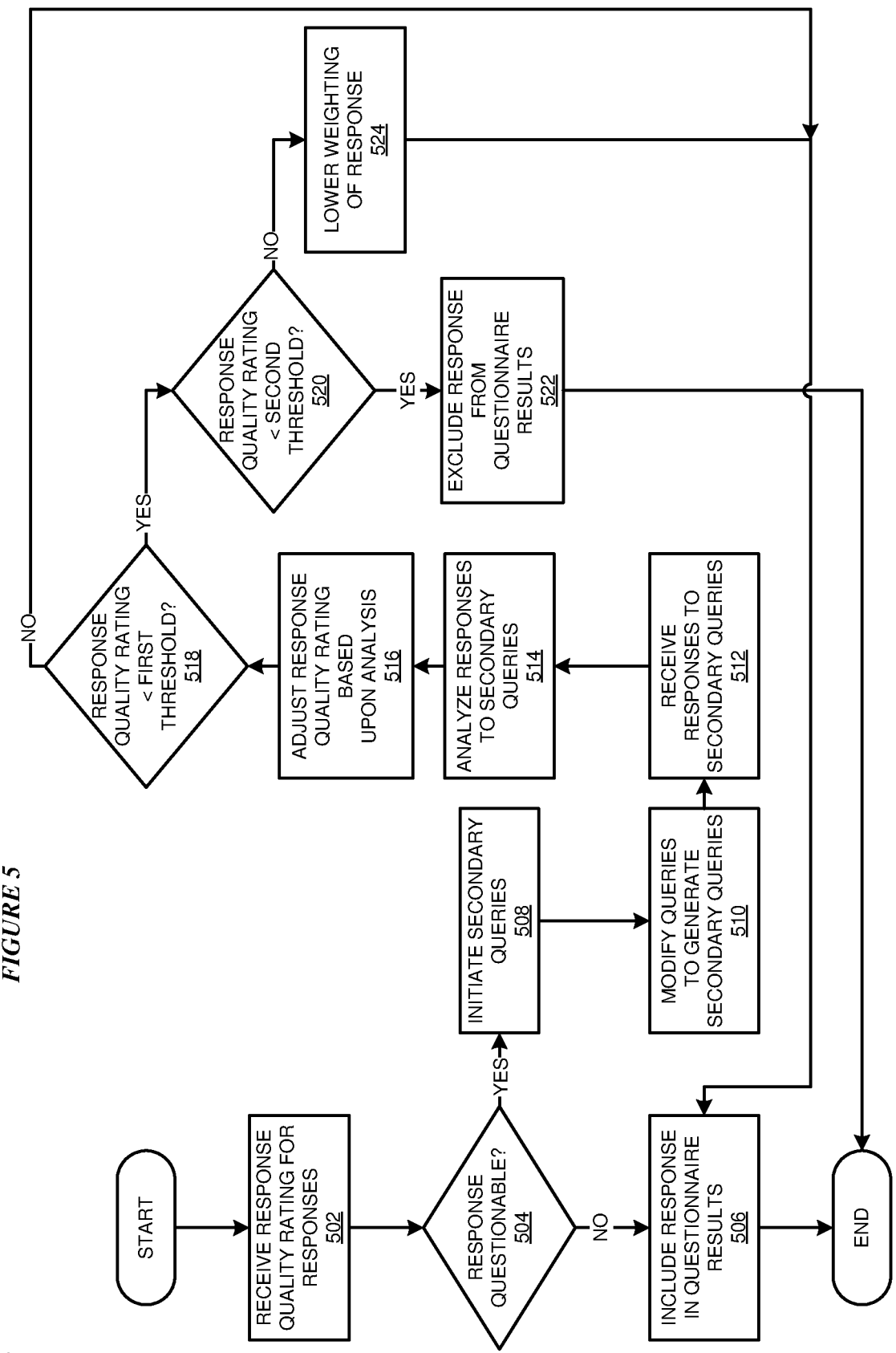
FIG. 5 depicts a flowchart of an example process for determining computer-implemented questionnaire results based upon identified response quality in accordance with an illustrative embodiment.

With reference to FIG. 5, this figure depicts a flowchart of an example process 500 for determining computer-implemented questionnaire results based upon identified response quality in accordance with an illustrative embodiment. In block 502, application 105 receives response quality ratings for one or more responses in which each of the one or more responses is determined as either questionable or acceptable. In one or more embodiments, the one or more responses are determined as either questionable or acceptable using the procedure 400 described with respect to FIG. 4. In block 504, application 105 determines whether the response is questionable.

If application 105 determines that the response is not questionable, in block 506 includes the response in the questionnaire results. If application 105 determines that the response is questionable, in block 508 application initiates a secondary queries procedure. In block 510, application 105 modifies the original queries to generate secondary queries.

In a particular embodiment, application 105 generates the secondary queries by presenting the original queries to the respondent in a different order such as a reverse order. In another particular embodiment, application 105 generates a secondary query by presenting a query to the respondent which requires a free-form text response in which the respondent enters unstructured text to provide further elaboration or an explanation of the response. In another particular embodiment, application 105 the secondary query includes a query to qualify a skill level of a respondent to determine whether the respondent has a skill, qualification, or experience to answer the query knowledgably.

In block 512, application 105 receives secondary responses to the secondary queries from the respondent. In block 514, application 105 analyzes the secondary responses to the secondary queries to determine whether the secondary responses are indicative of a validity of the responses. In a particular embodiment, if the secondary queries include the original queries in a different order, application 105 determines whether an identical or similar response to the original queries has been provided in response to the secondary queries to indicate an increased validity of the responses. In another particular embodiment, application 105 performs sentiment analysis upon a free-form response to determine if the response is consistent with a linked previous response. For example, the system may ask a respondent for an explanation of a previous response, and process the explanation through NLP to determine if the explanation is consistent with the answer. If the explanation is consistent, application 105 may indicate an increased validity of the responses.

In block 516, application 105 adjusts the response quality rating for one or more of the responses based upon the analysis. In one or more embodiments, application 105 increases the response quality rating for the one or more responses if the analysis indicates an increased validity of the response, and decreases the response quality rating for the one or more response if the analysis indicates of a decreased validity of the response.

In block 518, application 105 determines whether the response rating quality is less than a first threshold value. If application 105 determines that the response rating quality is not less than the first threshold value, process 500 continues to block 506 in which the response is included in the questionnaire results and process 500 ends. If application 105 determines that the response rating quality is less than the first threshold value, process 500 continues to block 520.

In block 502, application 105 determines whether the response quality rating is less than a second threshold value. If application 105 determines that the response rating quality is less than the second threshold value, process 500 continues to block 522. In block 522, application 105 excludes the response from the questionnaire results and process 500 ends. If application 105 determines that the response rating quality is not less than the second threshold value, process 500 continues to block 524. In block 524, application 105 lowers a weighting of the response in the questionnaire results and process 500 continues to block 506 in which the response is included in the questionnaire results and process 500 ends.

Accordingly, in one or more embodiments, responses that are fully qualified are used in the survey or questionnaire, responses that have a significantly lower response quality rating are excluded from the survey or questionnaire, and responses that are questionable but not excluded have an associated weight in the survey or questionnaire lowered by a percentage equal to the lowering of the response quality rating. In one or more embodiments, the threshold values are configurable by a user.

Thus, a computer implemented method, system or apparatus, and computer program product are provided in the illustrative embodiments for identifying response quality for computer-implemented questionnaire results based upon respondent behavior and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, the method comprising:
   sending, by a processor, one or more queries retrieved from a query database to a device associated with a respondent, wherein the query database includes a corpus of queries;
   receiving, by the processor responsive to the one or more queries, one or more responses to the one or more queries from the device associated with the respondent;
   receiving, by the processor, image data from a camera, wherein the image data represents an image of a position of a hand of the respondent while the respondent uses the hand to input, via a user interface (UI) of the device, a first response from among the one or more responses to a first query from among the one or more queries;
   determining, by the processor, a response quality rating for the first response based on a characteristic of an interaction of the respondent with the UI of the device, wherein the determining comprises:
      assigning a default value as the first response quality rating;
      detecting, as the characteristic of the interaction and based on the image data, the position of the hand being indicative of a problem, wherein the problem includes an inability of the respondent to reach a particular choice from among available choices for the first response due to the position of the hand; and
      reducing, responsive to detecting the position of the hand being indicative of the problem, the first response quality rating;
   determining, by the processor, that the first response is indicative of a questionable validity based upon the determined response quality rating;
   generating, by the processor responsive to determining that the first response is indicative of a questionable validity, a second query that requires a free-form text answer, wherein the second query asks the respondent for an explanation of the first response;
   analyzing, by the processor responsive to receiving a second response to the second query, the second response using natural language processing (NLP), wherein the analyzing comprises determining whether the second response is consistent with the first response;
   reducing, by the processor, the first response quality rating upon determining that the second response is not consistent with the first response, wherein the reducing of the first response quality rating results in the first response quality rating being less than a threshold value; and
   excluding, by the processor, the first response from the one or more responses, wherein the excluding is responsive to the first response quality rating being less than the threshold value.

2. The computer-implemented method of claim 1, further comprising:
   sending the second query to the device, wherein the second query is one of one or more secondary queries; and
   receiving the second response as one of one or more secondary responses from the device in response to the one or more secondary queries, the one or more secondary queries being indicative of a validity of the one or more responses.

3. The computer-implemented method of claim 2, further comprising:
   determining that the one or more responses are valid based upon the one or more secondary responses; and
   adding the one or more responses to a result responsive to determining that the one or more responses are valid.

4. The computer-implemented method of claim 2, further comprising:
   determining that the one or more responses are not valid based upon the one or more secondary responses; and
   removing the one or more responses from a result responsive to determining that the one or more responses are not valid.

5. The computer-implemented method of claim 4, wherein determining that the one or more responses are not valid further comprises:
   decreasing the response quality rating for the one or more responses based upon the one or more secondary responses, wherein removing the one or more responses is responsive to determining that the response quality rating is below a first threshold value.

6. The computer-implemented method of claim 2, further comprising:
   decreasing the response quality rating for the one or more responses based upon the one or more secondary responses;
   determining that the response quality rating is less than a second threshold value;
   decreasing a weighting value associated with the one or more responses responsive to determining that the response quality rating is less than the second threshold value; and
   adding the one or more responses to a result.

7. The computer-implemented method of claim 2, wherein the one or more secondary queries includes a query for an explanation from the respondent of the one or more responses.

8. The computer-implemented method of claim 7, wherein the one or more secondary responses includes an explanation of the one or more responses in a free-text form.

9. The computer-implemented method of claim 8, further comprising:
performing a sentiment analysis of the explanation to determine the validity of the one or more responses.

10. The computer-implemented method of claim 2, further comprising:
generating the one or more secondary queries by changing an order of the one or more queries.

11. The computer-implemented method of claim 1, further comprising:
determining a skill level associated with the respondent, wherein the validity of the one or more responses is based, at least in part, upon the determined skill level.

12. The computer-implemented method of claim 1, wherein an attentiveness level of the respondent is determined based upon eye movements of the respondent during reading of the one or more queries.

13. A computer usable program product comprising:
program instructions to send, by a processor, one or more queries retrieved from a query database to a device associated with a respondent, wherein the query database includes a corpus of queries;
program instructions to receive, by the processor responsive to the one or more queries, one or more responses to the one or more queries from the device associated with the respondent;
program instructions to receive, by the processor, image data from a camera, wherein the image data represents an image of a position of a hand of the respondent while the respondent uses the hand to input, via a user interface (UI) of the device, a first response from among the one or more responses to a first query from among the one or more queries;
program instructions to determine, by the processor, a response quality rating for the first response based on a characteristic of an interaction of the respondent with the UI of the device, wherein the program instructions to determine include program instructions to:
assign a default value as the first response quality rating;
detect, as the characteristic of the interaction and based on the image data, the position of the hand being indicative of a problem, wherein the problem includes an inability of the respondent to reach a particular choice from among available choices for the first response due to the position of the hand; and
reduce, responsive to detecting the position of the hand being indicative of the problem, the first response quality rating;
program instructions to determine, by the processor, that the first response is indicative of a questionable validity based upon the determined response quality rating;
program instructions to generate, by the processor responsive to determining that the first response is indicative of a questionable validity, a second query that requires a free-form text answer, wherein the second query asks the respondent for an explanation of the first response;
program instructions to analyze, by the processor responsive to receiving a second response to the second query, the second response using natural language processing (NLP), wherein the analyzing comprises determining whether the second response is consistent with the first response;
program instructions to reduce, by the processor, the first response quality rating upon determining that the second response is not consistent with the first response, wherein the reducing of the first response quality rating results in the first response quality rating being less than a threshold value; and
program instructions to exclude, by the processor, the first response from the one or more responses, wherein the excluding is responsive to the first response quality rating being less than the threshold value.

14. The computer usable program product of claim 13, further comprising:
program instructions to send the second query to the device, wherein the second query is one of one or more secondary queries; and
program instructions to receive the second response as one of one or more secondary responses from the device in response to the one or more secondary queries, the one or more secondary queries being indicative of a validity of the one or more responses.

15. The computer usable program product of claim 14, further comprising:
program instructions to determine that the one or more responses are valid based upon the one or more secondary responses; and
program instructions to add the one or more responses to a result responsive to determining that the one or more responses are valid.

16. The computer usable program product of claim 14, further comprising:
program instructions to determine that the one or more responses are not valid based upon the one or more secondary responses; and
program instructions to remove the one or more responses from a result responsive to determining that the one or more responses are not valid.

17. The computer usable program product of claim 16, wherein the program instructions to determine that the one or more responses are not valid further comprise:
program instructions to decreasing the response quality rating for the one or more responses based upon the one or more secondary responses, wherein removing the one or more responses is responsive to determining that the response quality rating is below a first threshold value.

18. The computer usable program product of claim 13, wherein the computer usable program product is stored in a computer readable storage device in a data processing system, and wherein the computer usable program product is transferred over a network from a remote data processing system.

19. The computer usable program product of claim 13, wherein the computer usable program product is stored in a computer readable storage device in a server data processing system, and wherein the computer usable program product is downloaded over a network to a remote data processing system for use in a computer readable storage device associated with the remote data processing system.

20. A computer system comprising:
program instructions to send, by a processor, one or more queries retrieved from a query database to a device associated with a respondent, wherein the query database includes a corpus of queries;
program instructions to receive, by the processor responsive to the one or more queries, one or more responses to the one or more queries from the device associated with the respondent;
program instructions to receive, by the processor, image data from a camera, wherein the image data represents an image of a position of a hand of the respondent while the respondent uses the hand to input, via a user interface (UI) of the device, a first response from among the one or more responses to a first query from among the one or more queries;

program instructions to determine, by the processor, a response quality rating for the first response based on a characteristic of an interaction of the respondent with the UI of the device, wherein the program instructions to determine include program instructions to:

assign a default value as the first response quality rating;

detect, as the characteristic of the interaction and based on the image data, the position of the hand being indicative of a problem, wherein the problem includes an inability of the respondent to reach a particular choice from among available choices for the first response due to the position of the hand; and reduce, responsive to detecting the position of the hand being indicative of the problem, the first response quality rating;

program instructions to determine, by the processor, that the first response is indicative of a questionable validity based upon the determined response quality rating;

program instructions to generate, by the processor responsive to determining that the first response is indicative of a questionable validity, a second query that requires a free-form text answer, wherein the second query asks the respondent for an explanation of the first response;

program instructions to analyze, by the processor responsive to receiving a second response to the second query, the second response using natural language processing (NLP), wherein the analyzing comprises determining whether the second response is consistent with the first response;

program instructions to reduce, by the processor, the first response quality rating upon determining that the second response is not consistent with the first response, wherein the reducing of the first response quality rating results in the first response quality rating being less than a threshold value; and program instructions to exclude, by the processor, the first response from the one or more responses, wherein the excluding is responsive to the first response quality rating being less than the threshold value.

\* \* \* \* \*